US010213910B2

(12) United States Patent
Davison et al.

(10) Patent No.: US 10,213,910 B2
(45) Date of Patent: Feb. 26, 2019

(54) SYSTEM AND METHOD FOR BUCKLE RELEASE ASSISTIVE DEVICE

(71) Applicant: B&B Solutions, LLC, Houston, TX (US)

(72) Inventors: Rebecca Davison, Houston, TX (US); Barbara Heilman, Houston, TX (US)

(73) Assignee: B&B Solutions, LLC, Houston, TX (US)

( * ) Notice: Subject to any disclaimer, the term of this patent is extended or adjusted under 35 U.S.C. 154(b) by 0 days.

(21) Appl. No.: 15/699,198

(22) Filed: Sep. 8, 2017

(65) Prior Publication Data

US 2018/0071902 A1 Mar. 15, 2018

Related U.S. Application Data

(60) Provisional application No. 62/394,080, filed on Sep. 13, 2016.

(51) Int. Cl.
| | |
|---|---|
| *B25G 1/10* | (2006.01) |
| *B25B 27/00* | (2006.01) |
| *A44B 11/25* | (2006.01) |
| *B60N 2/28* | (2006.01) |
| *B60R 22/10* | (2006.01) |

(52) U.S. Cl.
CPC ...... *B25B 27/0035* (2013.01); *A44B 11/2546* (2013.01); *B25G 1/102* (2013.01); *B60N 2/2812* (2013.01); *B60N 2002/2815* (2013.01); *B60R 22/105* (2013.01)

(58) Field of Classification Search
CPC . B25B 27/0035; A44B 11/2546; B25G 1/102; B60N 2/2812; B60N 2002/2815; B60R 22/105
USPC ........................................................ 81/15.9
See application file for complete search history.

(56) References Cited

U.S. PATENT DOCUMENTS

| | | | | |
|---|---|---|---|---|
| 1,195,932 | A * | 8/1916 | Swanson ................ | G04D 1/022 29/10 |
| 1,276,323 | A * | 8/1918 | Buresch ................. | B65B 7/285 53/344 |
| 3,906,957 | A * | 9/1975 | Weston ............... | A61B 17/2804 24/562 |
| 4,879,806 | A * | 11/1989 | Feng .................. | H05K 13/0491 29/401.1 |
| 5,282,737 | A * | 2/1994 | Ray ........................ | F23Q 25/00 131/236 |
| 7,384,086 | B2 * | 6/2008 | Lukaszynski ...... | H01H 85/0208 29/278 |
| 8,539,862 | B1 * | 9/2013 | Robinson ............... | B60R 22/00 24/578.13 |
| 2010/0078952 | A1 * | 4/2010 | Hurson .................. | A47G 21/10 294/99.2 |
| 2011/0308057 | A1 * | 12/2011 | Abrams .................... | B25B 7/02 29/426.5 |
| 2016/0166014 | A1 * | 6/2016 | Soenen ............. | A44B 11/2526 24/639 |

(Continued)

*Primary Examiner* — Hadi Shakeri
(74) *Attorney, Agent, or Firm* — Bell Nunnally & Martin LLP

(57) ABSTRACT

This invention relates in general to restraint systems for automotive vehicles and more particularly, to systems and methods for an assistive device including a C-shaped tool for use in depressing the actuator button of a car seat restraint harness to assist in unlocking the buckle.

13 Claims, 8 Drawing Sheets

(56) References Cited

U.S. PATENT DOCUMENTS

2018/0116344 A1\* 5/2018 Riley-Carter ...... A44B 11/2573
2018/0132571 A1\* 5/2018 Lambarth .......... A44B 11/2526

\* cited by examiner

SYSTEM AND METHOD FOR BUCKLE RELEASE ASSISTIVE DEVICE

CROSS-REFERENCE TO RELATED APPLICATIONS

The present application claims the benefit under 35 U.S.C. § 119(e) of U.S. Provisional Patent Application Ser. No. 62/394,080, filed Sep. 13, 2016, entitled, "System and Method for Buckle Release Assistive Device," which is hereby incorporated by reference for all purposes.

BACKGROUND

Technical Field

This invention relates in general to the field of occupant restraint systems and more particularly, but not by way of limitation, to systems and methods that assist with the depression of actuator buttons on restraint harnesses.

Background

Occupant restraint systems are well known. They typically have a first piece of belting having a buckle at one end and an opposite end is anchored in place. The anchoring may be either by direct fastening or via a device such as a retractor. A tongue is attached to a free end of a second piece of belting whose opposite end is also anchored. When the restraint system is in use to restrain a seated occupant, the two pieces of belting are connected by inserting the tongue of the second piece of belting into the buckle of the first piece of belting and adjusting the restraint around the occupant.

The buckle comprises a casing which contains a spring-loaded latching mechanism for releaseably latching the buckle to the tongue. A typical buckle casing comprises an aperture which exposes an actuating button for depression by a person's thumb or fingertip to cause the latching mechanism to release the buckle from the latched condition. In today's typical buckle, the area of the actuating button, which is exposed by the aperture, approximates that of the thumb or fingertip. The actuating button surface against which the thumb or fingertip presses is generally flush with the surface of the casing containing the aperture. Oftentimes, a smaller version of this same type of buckle and actuating button assembly is used in child restraint seats designed to secure an occupant, such as a baby or child, in place. The actuating button assembly installed in child restraint seats is regulated by the Federal Motor Vehicle Safety Standards (FMVSS), which recommends a minimum required release force to depress the actuating button of 40 N (Newton) or 9.0 lbf (pound-force).

For any of a number of various reasons, a person may be impaired from depressing the actuating button with this amount of force and, thus, unable to unlatch a child restraint seat buckle of this type. For instance, caregivers may have arthritis in their hands, which impacts the strength with which they can apply pressure in their thumbs to sufficiently depress the actuator button with the required force to release the buckle and remove the child from the car seat. With the increase in the number of grandparent caregivers, the lack of required thumb or finger strength presents a significant problem for the convenience of mobility in an automotive vehicle while caring for a young child. Further, the situation poses risks to child safety if the caregiver does not properly buckle the child to thereby make it easier for the caregiver to release the buckle when necessary. In addition to arthritis, other circumstances may arise where caregivers lack sufficient hand strength, including carpel tunnel syndrome, tendonitis and chronic or temporary conditions or injuries.

The existing prior art in U.S. Pat. No. 8,539,862, which is incorporated herein by reference, seeks to address many of the foregoing difficulties. However, for those with arthritis in their hands and fingers, gripping edges of the housing element is difficult or painful, resulting in an inadequate ability to exert the required pressure to release the buckle. Additionally, the prior art lacks a backing to support the intended use, resulting in the need to position a free hand without guidance, or to push hard against the occupant of the car seat and apply uncomfortable pressure. The prior art offers no method for reducing or otherwise alleviating the amount of force required by the user to release the buckle.

Other attempts at addressing the above described difficulties include the use of pliers to depress the button to release the buckle from the latched condition. For example, a pair of standard pliers may be modified to have a protrusion on an end thereof to allow the protrusion to press the release button when the pliers are closed. However, this solution does not address the difficulty experienced by users with arthritis and other hand ailments. Oftentimes, users with arthritis have a difficult time using scissors or pliers due to the manual dexterity required. Therefore, a solution is needed that allows the button to be depressed in a method that requires minimal thumb or finger strength.

In another prior art attempt to address the above described difficulties, a lever arm is attached to the seat belt below the buckle. The lever arm has a protrusion thereon so that when force is applied to an opposite end of the lever, the protrusion depresses the button. While this solution allows pressure to be applied using the palm of the hand, rather than relying on individual finger strength, it requires a user to apply pressure straight into the buckle. This is often difficult to accomplish because the parent or guardian is normally reaching in from the side of the car seat when trying to unbuckle the occupant. One additional drawback of this type of lever arm is that it requires the device to be affixed to the strap of the car seat as a source of leverage, which poses a safety risks if a child learns to use the device to release the latch, but lacks the maturity to know when it is safe to do so. By remaining affixed to the car seat, the device has the potential to enable a child to release the latch while the car is in motion.

SUMMARY OF THE INVENTION

The buckle release assistive device of the present invention seeks to overcome the prior art by addressing these considerations with a unique design that was developed by an occupational therapist specializing in hand therapy with expertise in designing rehabilitative solutions for activities required in daily life. Unique features of the design, which distinguish it from the prior art, may include, among other things, the use of a lever arm to reduce pressure required to push the device, the lack of dependency on the fingers for gripping the device and the ability to use the device from a side of the occupant.

With the known problems associated with the art, the buckle release assistive device was conceived and one of its objectives is to provide a tool for use in depressing the actuator button of a car seat restraint harness and releasing the buckle from the locking engagement of the car seat restraint harness in a less painful and more convenient manner than through pressing the actuator button directly, and which application is easily adapted to a variety of automotive vehicle occupant restraint systems including, but not limited to, child car seat restraint systems.

It is a further objective of the present invention to provide a buckle release assistive device which can easily and conveniently be stored in the vehicle with a child car seat and as an accessory to the child car seat. Oftentimes, it is important that the device remain out of reach of the child, to eliminate the risk that the child could release the buckle while the automotive vehicle is in motion.

It is still another objective of the present invention to provide a buckle release assistive device to alleviate hand or finger pain caused by repetitive motion of depressing the pre-existing actuator button of vehicle occupant restraint systems including, but not limited to, child car seat restraint systems.

Yet another objective of the present invention to is provide a useful and safe buckle release assistive device to enable individuals with chronic hand pain or limited hand function to use a standard vehicle occupant restraint systems including, but not limited to, child car seat restraint systems.

Other objectives and advantages of the buckle release assistive device become apparent to those skilled in the art as a more detailed explanation of the invention is presented below. The drawings disclose a buckle release assistive device according to one possible embodiment for carrying out buckle release assistance. Although other embodiments are contemplated using the same inventive concepts disclosed herein. The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
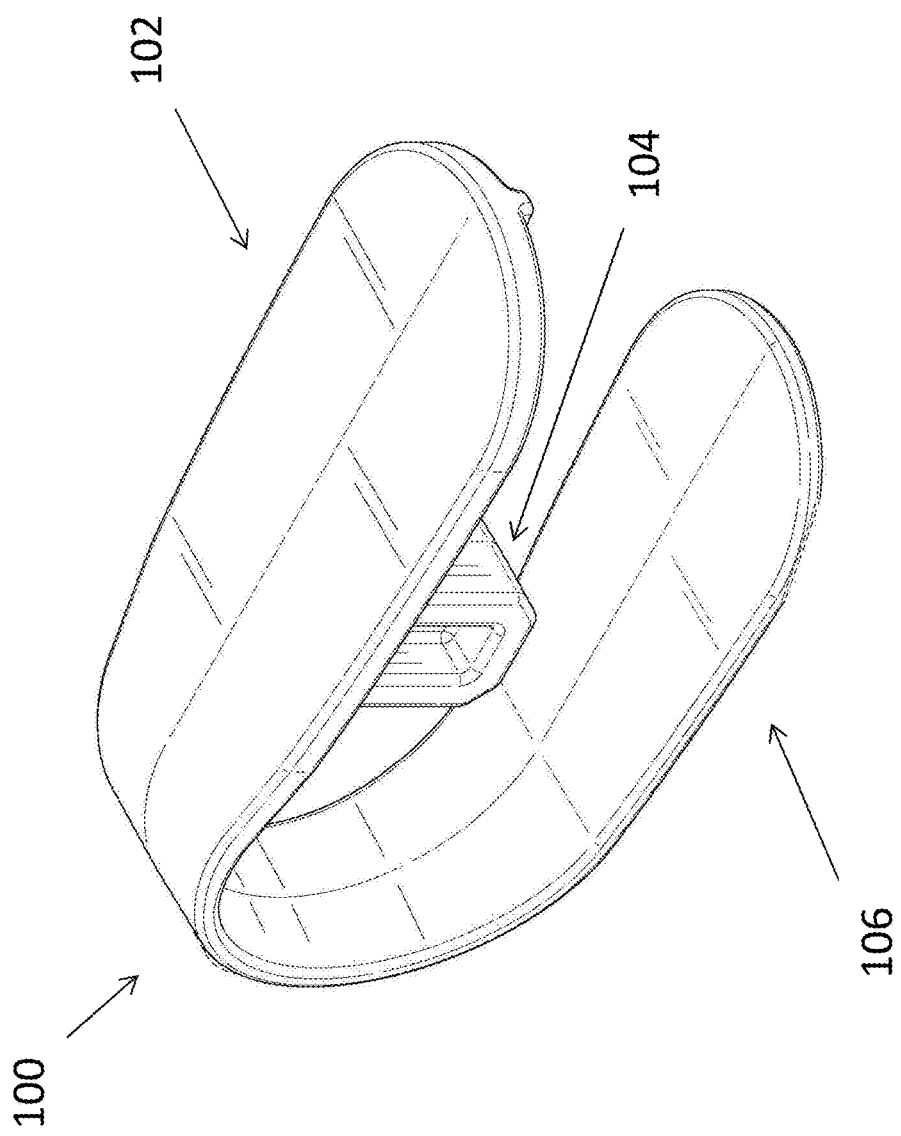
FIG. 1 is a perspective view of a buckle release assembly according to an embodiment of the present invention.

FIG. 1 is a perspective view of an embodiment of a buckle release assembly 100. In this embodiment, the buckle release assembly 100 has a generally C-shaped body having an upper portion that forms a handle 102, a lower portion that forms a back 106, and a generally curved middle section between the upper and lower portions. While the embodiment shown has a generally curved middle section, in various embodiments, the middle section may include one or more angles or a combination of angles and curves. In the embodiment shown, the handle 102 has an actuator 104 protruding from an inner surface and a generally flat outer surface. In various embodiments, the outer surface of the handle 102 positioned at the top of the C-shaped body may include one or more grooves, may be textured, may be coated in a non-skip material, or may include one or more protrusions therefrom to further facilitate depression of the actuator. In other embodiments, the handle 102 may additionally include a soft non-skid material cover that provides comfort, stability and improved functionality of the buckle release assembly 100. In various embodiments, the buckle release assistive device 100 may be constructed from moldable plastic. In other embodiments, the buckle release assistive device 100 may be constructed out of metal, a metal-alloy, a composite material, a flexible material, a rigid material, or a combination of materials depending on the characteristics desired. For example, in some embodiments, the handle portion of the buckle release assistive device 100 may be formed of a relatively rigid material to allow more downward force to be exerted on the buckle whereas the middle section may be formed of a more flexible material to allow ease of compression of the handle towards the back. In various embodiments, the buckle release assistive device 100 may be a single unitary body or may be a combination of multiple component parts. In other embodiments, the device 100 is formed using a plurality of pieces to construct the device, for example but not by way of limitation, a separate handle element 102 attached to a hinge (not shown) which is further attached to the bottom element 106. The hinge may include an accompanying spring (not shown) attached to the handle element 102 and the bottom element 106.

Figure 2:
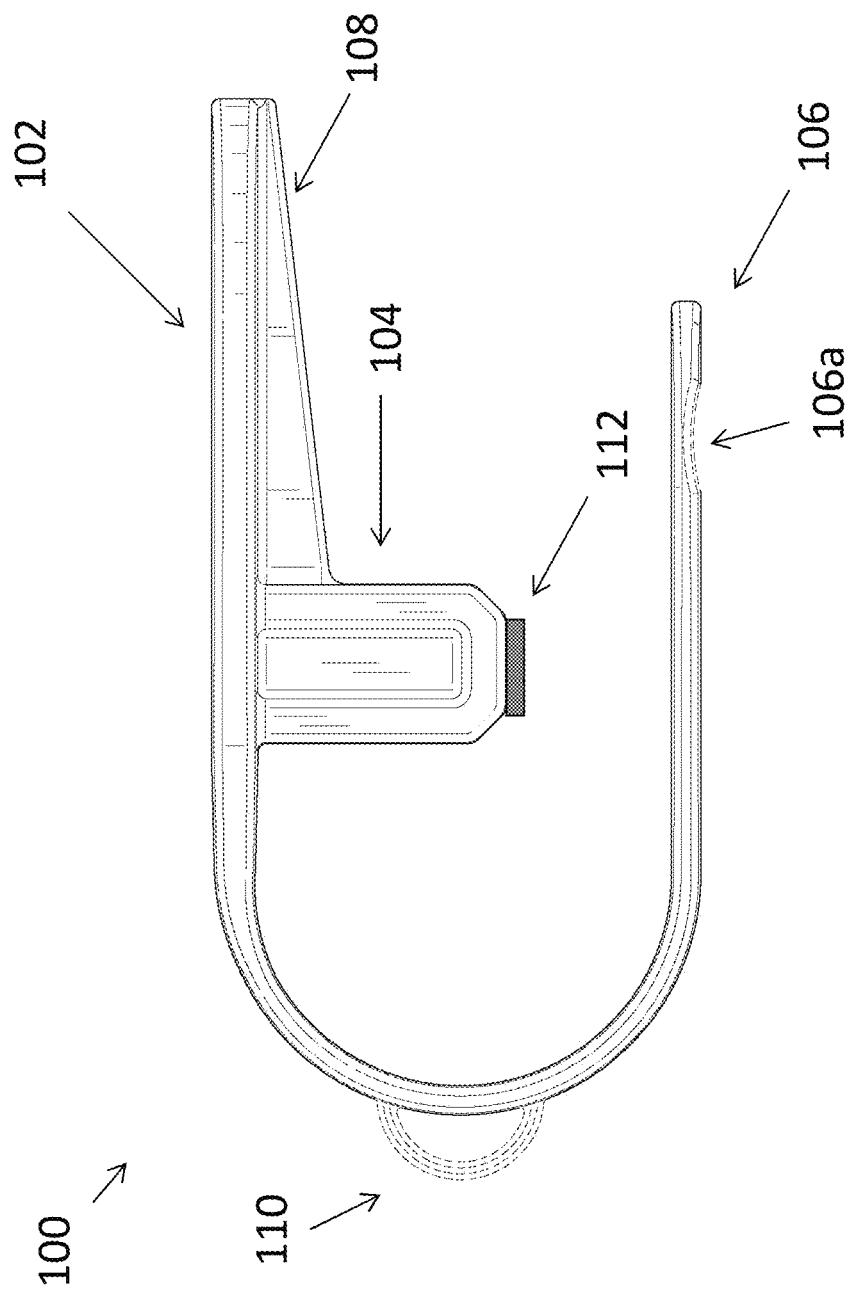
FIG. 2 is a side view of an embodiment of the buckle release assembly of FIG. 1.

Referring now to FIG. 2, a side view of an embodiment of a buckle release assembly 100 is provided showing the handle 102 having the actuator 104 protruding downwardly from an inner surface thereof. The actuator 104 is provided on the underside of the top of the C-shaped body to apply pressure to the pre-existing restraint release actuating button when the handle 102 is depressed towards the back 106, thereby causing the release of the restraint buckle. In the embodiment shown, a support 108 can also be seen extending from the inner surface of the handle 102. In various embodiments, the support 108 may provide structural support to the handle 102 to prevent the handle 102 from deforming when downward pressure is applied to an outer surface thereof. In the embodiment shown, the actuator 104 includes a non-skid material 112 for stability when pressed to engage a restraint release actuating button and cause release of the restraint buckle by applying pressure thereto. In the embodiment shown, the middle section includes a loop 110 extending outwardly therefore to facilitate connections to, for example, a key ring. As can also be seen in the embodiment shown, the back 106 may include one or more finger grooves 106a on an outer surface thereof to facilitate finger placement during use, to maintain stability, and/or correct functional placement. The support 108 is positioned on the underside of the handle 102 and extends from the outer edge inwardly to the actuator 104. In other embodiments, the actuator 104 may be provided near a distal end of the handle 102, near a mid-point of the handle 102, or closer to the middle section of the buckle release assistive device 100. In some embodiments, the actuator may be round or may be square or other polygonal or irregular shape. In some embodiments, the thickness of the material may vary throughout the length of the buckle release assistive device 100. In the embodiment shown, the thickness of the handle 102 is greater than the thickness of the curved middle section and the back 106. In various embodiments, material may be removed from the curved middle section and/or the back 106 to reduce the overall thickness of those portions, such as from an outer surface, an inner surface, or a middle portion to create gaps therein. In various embodiments, reducing the overall thickness of the curved middle section may enhance the compressability of the overall buckle release assistive device 100. In some embodiments, the buckle release assembly 100 may provide compression to the buckle without a user applying force to the handle. In such embodiments, a user may separate the handle 102 from the back 106 before placing the buckle release assembly 100 around a buckle and then the buckle release assembly 100 applies a compressive force to the buckle. As an example and not by way of limitation, the design provides a Class 2 lever functionality to physically reduce the amount of force required by the user needed to release the buckle. Additionally, in various embodiments, a Class 3 type lever design may also be utilized.

Figure 3:
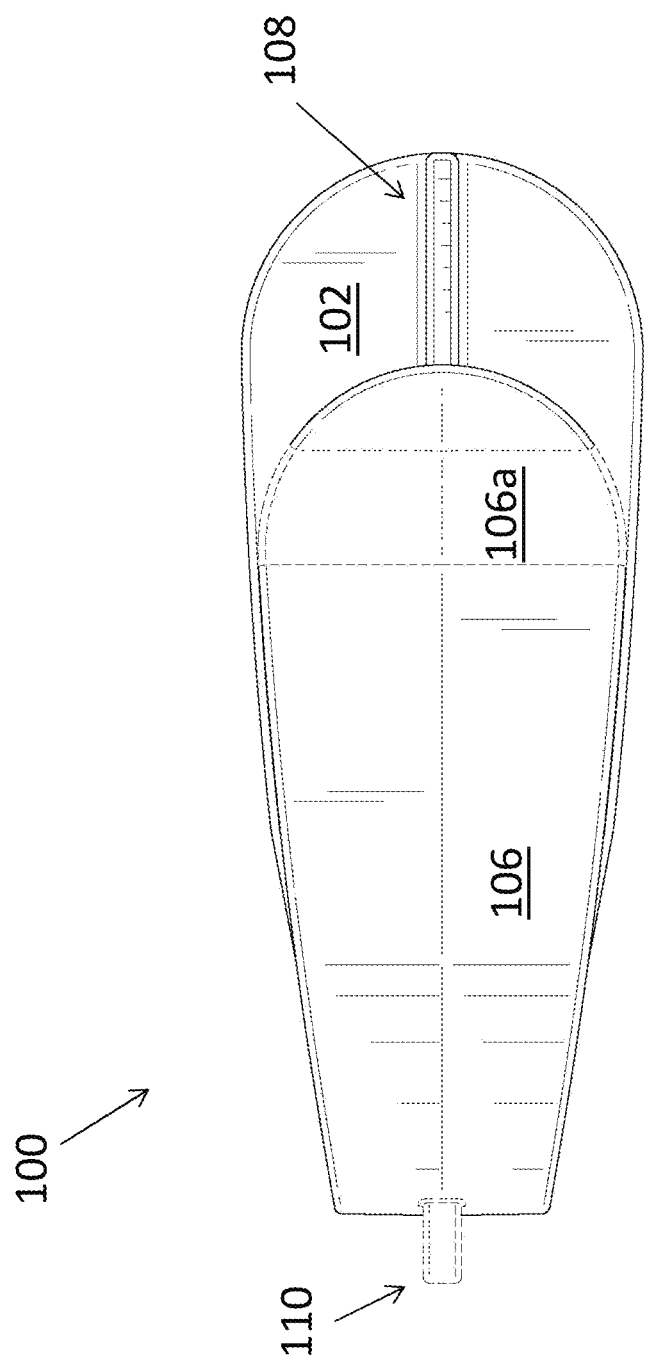
FIG. 3 is a bottom view of an embodiment of the buckle release assembly of FIG. 1.

Referring now to FIG. 3, a bottom view of an embodiment of the buckle release assistive device 100 showing an outer surface of the back 106 is provided. In the embodiment shown, the outer surface of the back 106 includes a finger groove 106a extending the full width of the back 106. In various embodiments, the back 106 may include a plurality of finger grooves 106a and/or the finger grooves may extend only partially across the back. In the embodiment shown, the support 108 can be seen on the inner surface of the handle 102. The loop 110 can also be seen extending outwardly from the middle section of the buckle release assistive device 100.

Figure 4:
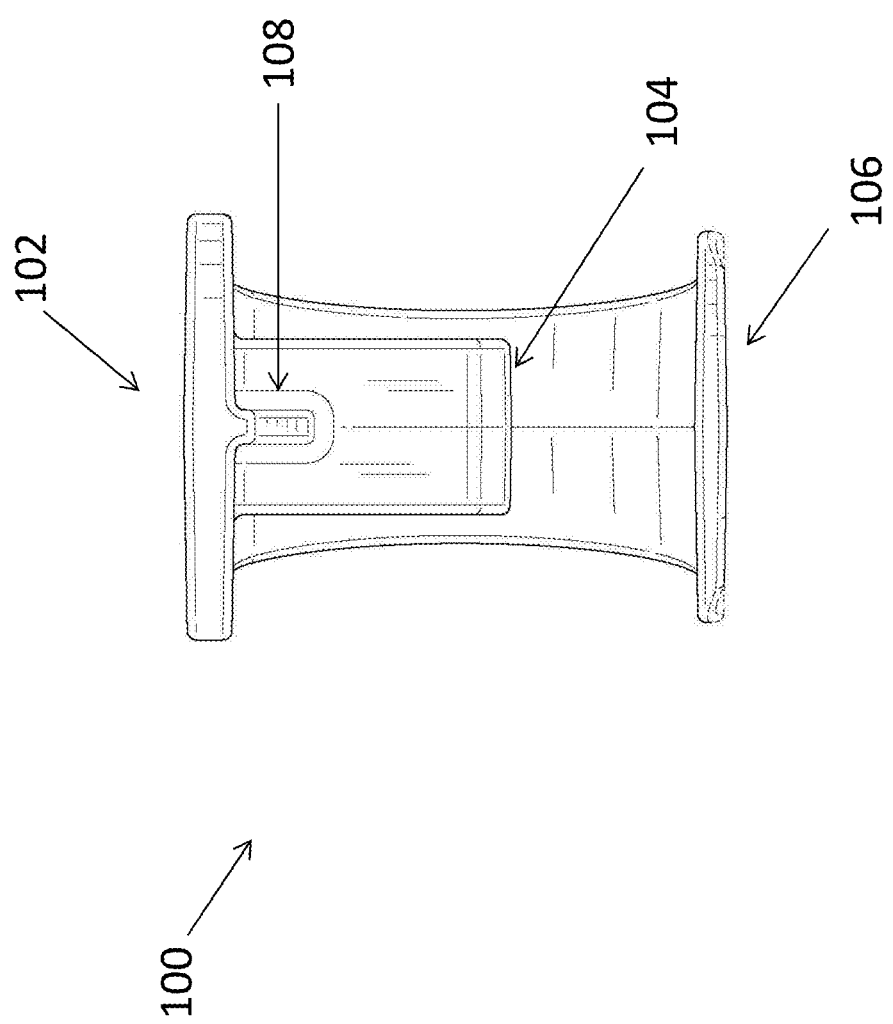
FIG. 4 is a front view of an embodiment of the buckle release assembly of FIG. 1.

Referring now to FIG. 4, a front view of an embodiment of the buckle release assistive device 100 is provided. In the embodiment, the support 108 and actuator 104 can be seen extending from an inner surface of the handle 102. In some embodiments, the handle 102 may include a plurality of supports or the support may be disposed inside the handle 102 or on an upper surface of the handle 102. In the embodiment shown, the actuator 104 extends more than half way between the handle 102 and the back 106. In various embodiments, the actuator 104 may extend exactly half way or may extend less than half way between the two surfaces. In other embodiments, the actuator 104 may be movable along a horizontal axis formed by the support 108 and extendable or retractable to various heights to allow the buckle release assistive device 100 to be customizable depending on the design characteristics of various restraint harnesses. In a further embodiment, the device 100 may contain a second protrusion, wherein the second protrusion is provided on the inner surface of the back 106 to apply pressure to restraint release actuating buttons on opposing sides of a buckle, such that when the handle 102 is compressed towards the back 106, pressure is applied simultaneously to multiple restraint release actuating buttons, thereby causing the release of the restraint buckle.

Figure 5A:
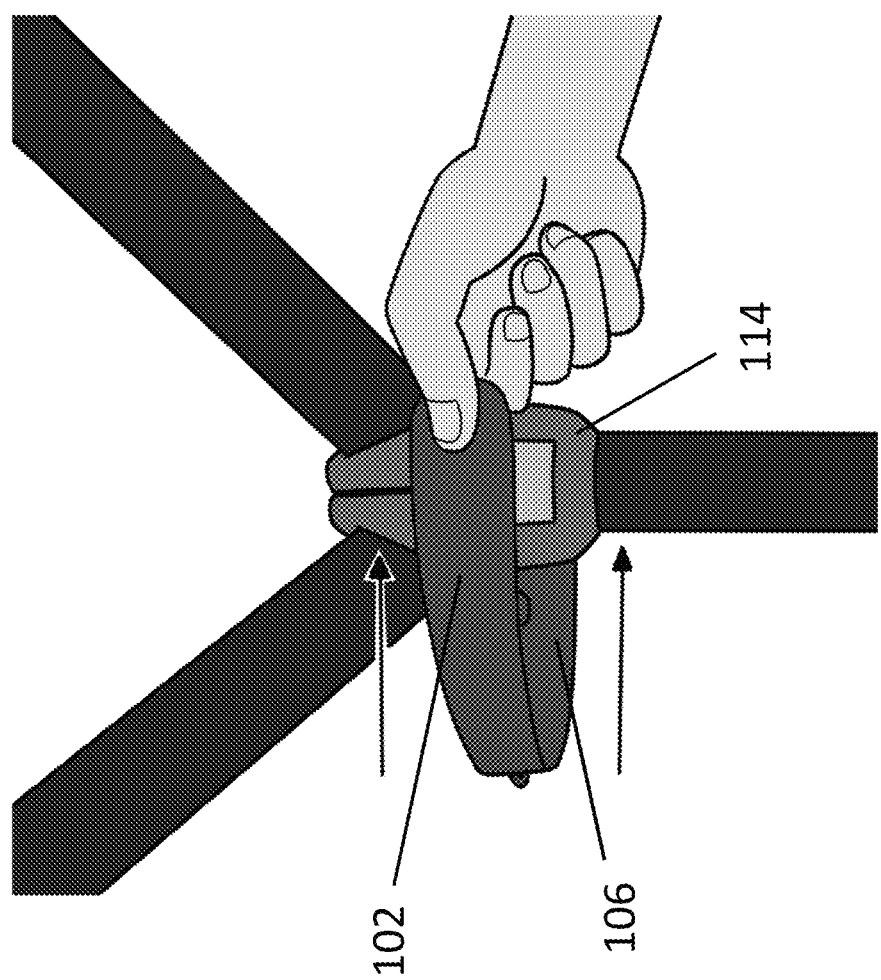
FIGS. 5a through 5c are drawings depicting an embodiment of the buckle release assembly of FIG. 1 in use.
Figure 5B:
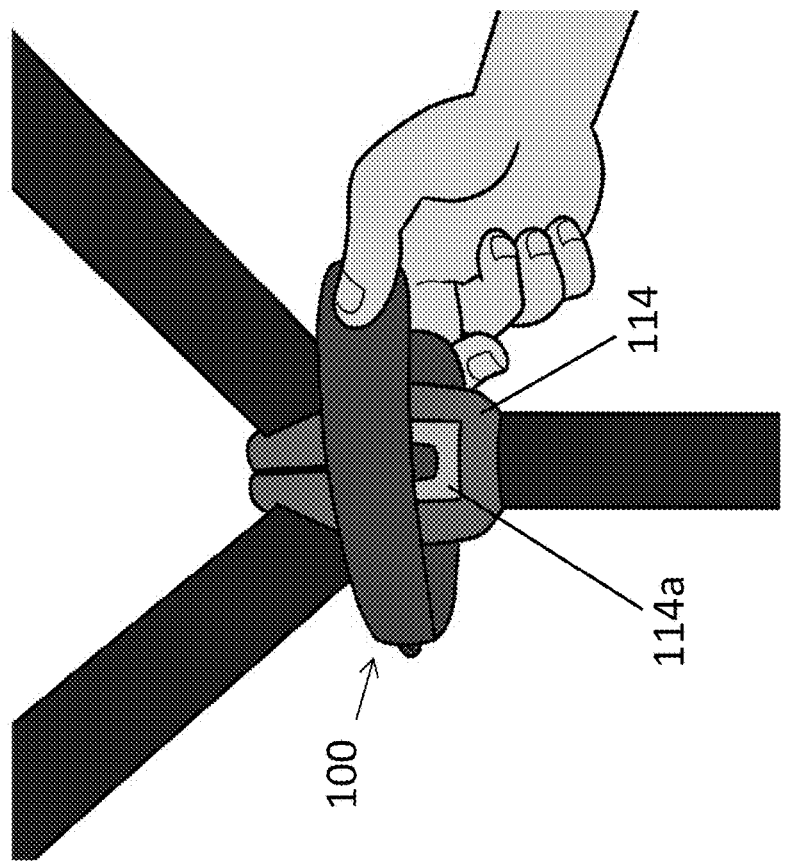
Figure 5C:
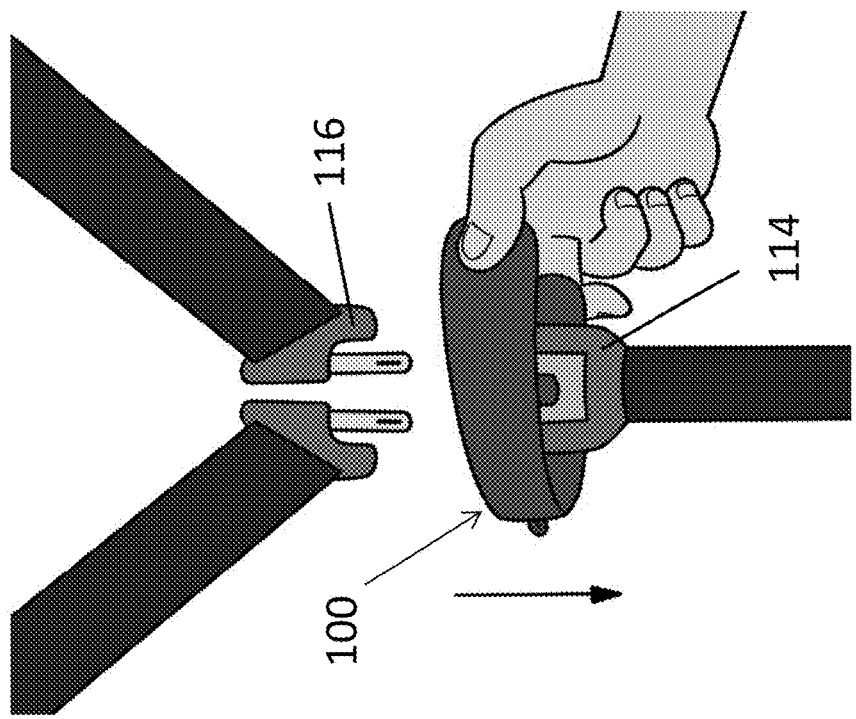

Referring now to FIGS. 5a through 5c, an example of a method of using an embodiment of a buckle release assistive device 100 is provided. As shown in FIG. 5a, the buckle release assistive device 100 is positioned around a buckle 114 of a safety restraint harness, wherein the back 106 is positioned against a backside of the buckle 114 and the handle 102 is positioned against a top of the buckle 114. While the buckle release assistive device 100 is shown being slid around the buckle from left to right, the buckle release assistive device 100 could be turned around and slid around the buckle from right to left. In various embodiments, the back 106 guides the user to slide the buckle release assistive device 100 around a buckle 114 such that the back 106 is positioned behind the buckle 114 and the handle 102 is positioned on top of the buckle 114, such that the actuator 104 is aligned against the restraint release actuating button.

As shown in FIG. 5b, the buckle release assistive device 100 has been slid around the buckle 114 until the actuator protruding from the inner surface of the handle 102 is aligned with the release button 114a of the buckle 114. Once the actuator is aligned with the release button 114a of the buckle 114, the user may depress the handle 102 towards the back 106 by exerting force on the flat surface of the handle to thereby exert pressure on the release button 114a to unlock the buckle. Once the buckle release assistive device is positioned correctly, the user may engage the ends of the handle 102 and the back 106 together, using one or more fingers to secure positioning of the back 106 and a portion of the hand, such as the thumb or palm, or the user's other hand, to apply pressure on the handle 102, causing the actuator 104 to engage the restraint release button and thereby causing the release of the restraint buckle. Although the embodiment shown in FIG. 5b depicts a user using a thumb to depress the handle 102 and a forefinger to support the back 106, the release button 114a may be depressed in a number of different manners, including using two hands, one to push against the handle and another to push against the back, using a single hand and only pushing against the handle, using a single hand and pressing against the handle with a palm of a hand and pressing against the back with the fingers of the same hand, or other method as dictated by the abilities of the user.

As shown in FIG. 5c, the buckle release assistive device 100 has been utilized to exert sufficient force on the release button 114a to unlock the buckle 114 and release the tongue portions 116 of the restraint harness. After the buckle 114 has been unlocked, a user may simply pull the tongue portions 116 out of the buckle or may exert a downward force on the buckle 114 to facilitate disengagement. In the embodiment shown, the restraint harness includes a single belt coupled to the buckle 114 and two tongue portions 116. In other embodiments, the restraint harness may include a single tongue portion 116 and may include a plurality of belt portions, such as, for example, in a five-point harness.

Figure 6:
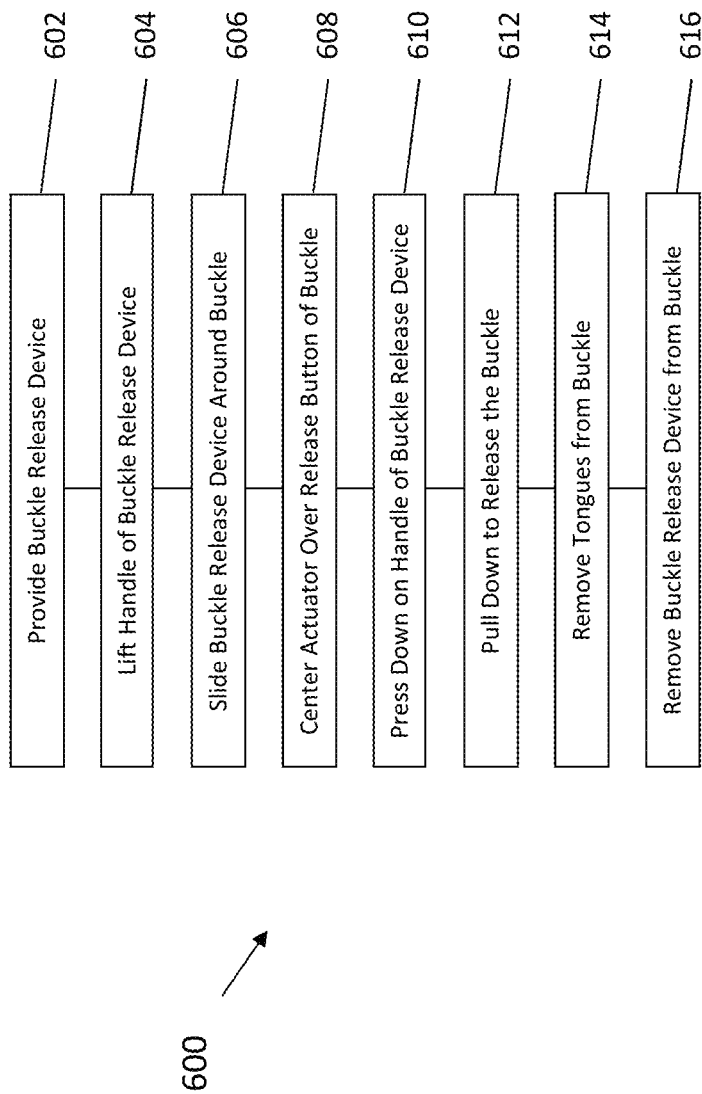
FIG. 6 is a flow chart of an exemplary method of using an embodiment of the buckle release assembly of FIG. 1.

Referring now to FIG. 6, a flow chart showing an exemplary method 600 for using a buckle release assembly is shown. Initially, at step 602, a buckle release device is provided. Next, at step 604, the handle or lever arm of the buckle release device is lifted away from the back to allow the buckle release device to be positioned around a buckle of a restraint harness at step 606. Once the buckle release device is positioned around the buckle, at step 608, the actuator of the buckle release device is aligned with the release button of the buckle. When the actuator is properly aligned, the handle and back of the buckle release device are compressed together by pressing the handle element downward relative to the back at step 610, thereby applying pressure to the restraint release button of the buckle. Once the restraint release button has been sufficiently depressed to unlock the buckle locking mechanism, then, at step 612, the user pulls the buckle release device in a direction opposite the tongues of the restraint harness, thereby releasing the tongues from the buckle. Following the release, at step 614, the user then removes the tongues from the buckle, and finally, at step 616, the buckle release device is removed from around the buckle.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A button release assistive device comprising:
a flexible base portion connecting a proximal portion of a first leg and a proximal portion of a second leg, the first leg and the second leg terminating at the flexible base portion to form a C-shape configured to be placed around a side of a buckle of a restraint harness of a car seat and the first leg being longer than the second leg;
a protrusion extending from an inner surface of the first leg into a region bounded by the first leg, the second leg, and the flexible base portion, the protrusion terminating at an end surface and the protrusion being closer to the base than a distal end of the first leg;
wherein the flexible base portion, the first leg, the protrusion, and the second leg are molded as a single unit, the flexible base portion being formed of a resilient material and the first leg being rigid relative to the flexible base portion;
wherein the C-shape is adapted to fit around the side of the buckle such that an inner surface of the second leg abuts a back surface of the buckle and the end surface of the protrusion abuts an actuator button of the buckle;
wherein the end surface of the protrusion is configured to depress the actuator button of the buckle when a user applies force on an outer surface of the first leg in a first direction towards the second leg to move the end surface of the protrusion in the first direction towards the second leg;
wherein the end surface of the protrusion that extends from the inner surface of the first leg is positioned between the flexible base portion and the distal end of the first leg at a location spaced apart from the distal end of the first leg; and
wherein the distal end of the first leg extends beyond the end surface of the protrusion such that when the force is applied to the distal end of the first leg, the first leg acts as a lever arm providing a mechanical advantage by producing more force on the actuator button than is applied to the distal end of the first leg.

2. The device of claim 1, wherein the end surface of the protrusion is generally parallel to an inner surface of the second leg.

3. The device of claim 1, wherein the protrusion has a non-skid surface on the end surface.

4. The device of claim 1, wherein the first leg has a texture on the outer surface thereof.

5. The device of claim 1, wherein the second leg has one or more grooves on an outer surface thereof.

6. The device of claim 1, wherein the C-shape is configured for the user to apply the force using a first hand and to place a second hand around the flexible base portion to support an outer surface of the second leg.

7. The device of claim 1, wherein the C-shape is configured for the user to place a hand around the flexible base portion to support an outer surface of the second leg when the force is applied in the first direction.

8. The device of claim 1, wherein the end surface of the protrusion is spaced apart from the inner surface of the second leg to facilitate receiving the buckle therebetween.

9. A button release assistive device comprising:
a flexible base portion connecting a proximal portion of a first leg and a proximal portion of a second leg, the first leg and the second leg terminating at the flexible base portion to form a C-shape configured to be placed around a side of a buckle of a restraint harness of a car seat and the first leg being longer than the second leg;
a protrusion extending from an inner surface of the first leg into a region bounded by the first leg, the second leg, and the flexible base portion, the protrusion terminating at an end surface and the protrusion being closer to the base than a distal end of the first leg;
wherein the end surface of the protrusion is generally parallel to an inner surface of the second leg, the end surface being spaced apart from the inner surface of the second leg to facilitate the C-shape receiving the buckle therebetween;
wherein the C-shape is configured to fit around the side of the buckle such that the second leg abuts a back surface of the buckle and the end surface of the protrusion abuts an actuator button of the buckle;
wherein the end surface of the protrusion is configured to depress the actuator button of the buckle when a user applies force on an outer surface of the first leg in a first direction towards the second leg to move the end surface of the protrusion in the first direction towards the second leg;
wherein the end surface of the protrusion that extends from the inner surface of the first leg is disposed between the flexible base portion and the distal end of the first leg at a location spaced apart from the distal end of the first leg; and
wherein the distal end of the first leg extends beyond the end surface of the protrusion, such that when the force is applied to the distal end of the first leg, the first leg acts as a lever arm providing a mechanical advantage by producing more force on the actuator button than is applied to the distal end of the first leg.

10. The device of claim 9 wherein the flexible base portion is formed of a resilient material and the first leg is rigid relative to the flexible base portion.

11. The device of claim 9, wherein the protrusion has a non-skid surface on the end surface.

12. A button release assistive device comprising:
a curved base portion connecting a proximal portion of a first leg and a proximal portion of a second leg, the first leg and the second leg terminating at the curved base portion to form a C-shape configured to be placed around a side of a buckle of a restraint harness of a car seat and the first leg being longer than the second leg;
a protrusion extending from an inner surface of the first leg into a region bounded by the first leg, the second leg, and the curved base portion, the protrusion terminating at an end surface and the protrusion being closer to the curved base than a distal end of the first leg;
wherein the curved based portion, the first leg, the protrusion, and the second leg are molded as a single unit;
wherein the curved base portion is relatively flexible and the first leg and the second leg are relatively rigid;
wherein the C-shape is adapted to fit around the side of the buckle such that the second leg abuts a back surface of the buckle and the end surface of the protrusion abuts an actuator button of the buckle;
wherein the end surface of the protrusion is configured to depress the actuator button of the buckle when a user applies force on an outer surface of the first leg in a first direction towards the second leg to move the end surface of the protrusion in the first direction towards the second leg;
wherein the end surface of the protrusion that extends from the inner surface of the first leg is positioned between the curved base portion and the distal end of the first leg at a location spaced apart from the distal end of the first leg to provide a mechanical advantage when the force is applied to the outer surface of the first leg.

13. The device of claim 12, wherein the end surface of the protrusion is generally parallel to an inner surface of the second leg.

\* \* \* \* \*